United States Patent
Kushida (10) Patent No.: US 6,545,443 B2
(45) Date of Patent: Apr. 8, 2003

(54) PULSE WIDTH MODULATION CIRCUIT CONTROLLING OUTPUT CURRENT OF AN INVERTER CIRCUIT FOR MOTOR-DRIVEN BLOWER OR ELECTRIC VACUUM CLEANER

(75) Inventor: Hiroyuki Kushida, Odawara (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 0 days.

(21) Appl. No.: 09/987,853

(22) Filed: Nov. 16, 2001

(65) Prior Publication Data

US 2002/0057069 A1 May 16, 2002

(30) Foreign Application Priority Data

Nov. 16, 2000 (JP) .................................. 2000-348964

(51) Int. Cl.[7] .................................................. H02P 7/36
(52) U.S. Cl. ........................ 318/727; 318/254; 318/138; 318/439
(58) Field of Search .............................. 318/727, 284, 318/138, 439, 434

(56) References Cited

U.S. PATENT DOCUMENTS

| | | | | |
|---|---|---|---|---|
| 5,345,156 A | * | 9/1994 | Moreira | 318/254 |
| 5,448,141 A | * | 9/1995 | Kelley et al. | 318/138 |
| 5,475,290 A | * | 12/1995 | Tani et al. | 318/434 |
| 5,814,957 A | | 9/1998 | Yoshida | 318/439 |
| 5,901,268 A | | 5/1999 | Ando et al. | 318/811 |
| 6,041,625 A | * | 3/2000 | Nagai et al. | 68/12.02 |
| 6,191,545 B1 | * | 2/2001 | Kawabata et al. | 318/138 |

FOREIGN PATENT DOCUMENTS

| | | |
|---|---|---|
| EP | 0 735 663 | 10/1996 |
| JP | 62-272877 | 11/1987 |
| WO | WO 97/15111 | 4/1997 |

* cited by examiner

*Primary Examiner*—Rita Leykin
(74) *Attorney, Agent, or Firm*—Oblon, Spivak, McClelland, Maier & Neustadt, P.C.

(57) ABSTRACT

The present invention provides a PWM control device wherein a microprocessor detects the rotational position of rotor of a brushless motor with respect to the amount of each current supplied from an inverter circuit for driving the brushless motor to the brushless motor and outputting of a PWM signal through the use of its detected signal to thereby perform PWM control. Upon startup of the brushless motor under the PWM control, the pulse width of the PWM signal is enlarged during interrupt processing including a process for detecting the rotational position of rotor of the brushless motor, and the pulse width of the PWM signal is progressively enlarged according to the repetition of the interrupt processing. It is thus possible to easily suppress an overshoot current with respect to the current supplied to the motor upon startup of the motor.

12 Claims, 13 Drawing Sheets

PULSE WIDTH MODULATION CIRCUIT CONTROLLING OUTPUT CURRENT OF AN INVERTER CIRCUIT FOR MOTOR-DRIVEN BLOWER OR ELECTRIC VACUUM CLEANER

CROSS REFERENCE TO RELATED APPLICATION

The present application is based on Japanese Priority Document 2000-348964 filed on Nov. 16, 2000.

BACKGROUND OF THE INVENTION

1. Field of the Invention

The present invention relates to a PWM control device for PWM controlling an output current of an inverter circuit, and a motor-driven blower and an electric vacuum cleaner each equipped with an electric motor driven by the output current thereof PWM-controlled by the PWM control device. The electric vacuum cleaner described herein includes various devices, which collect various solids or fluids to a collection region through the use of negative pressure.

2. Description of the Related Art

Figure 12:
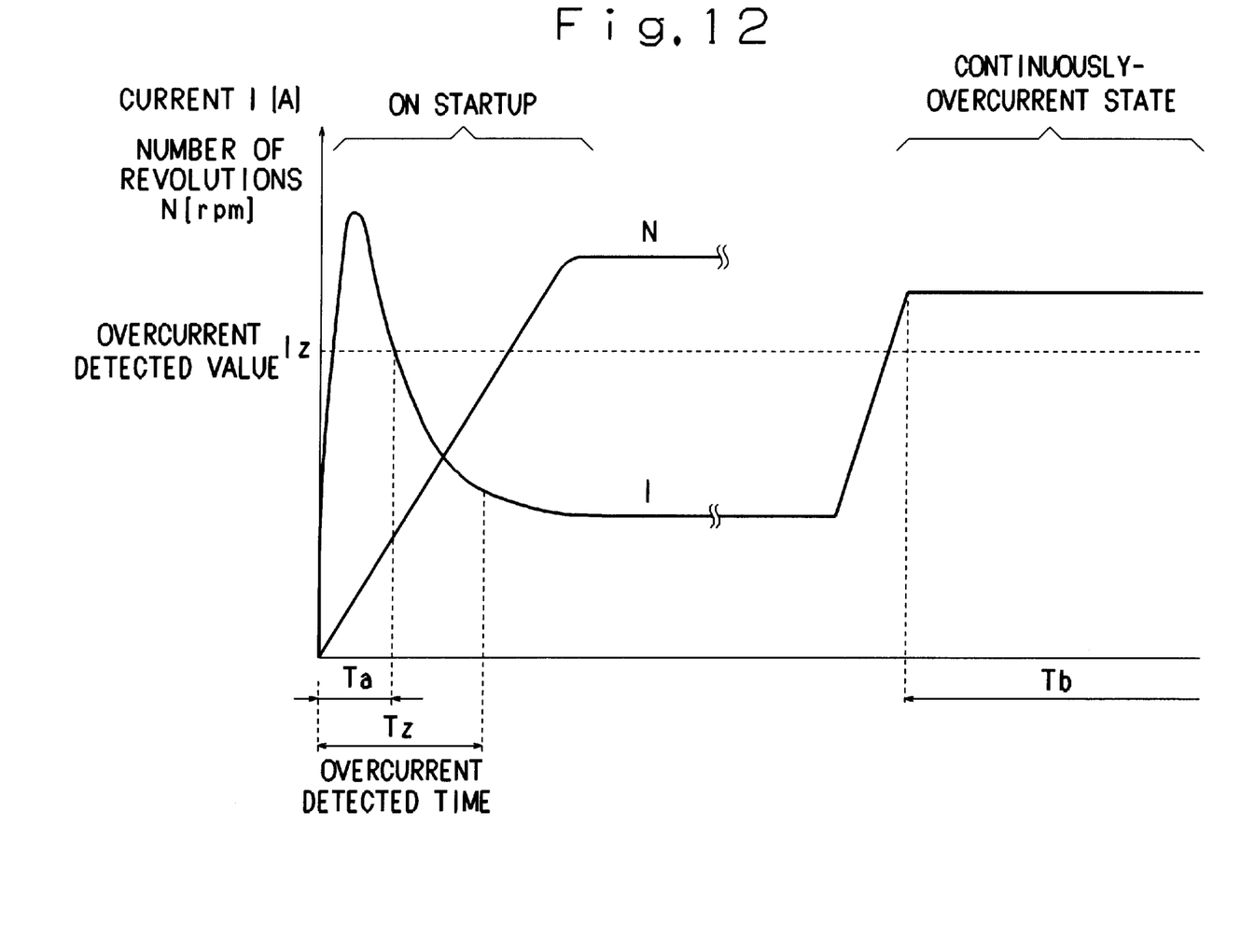
FIG. 12 is an explanatory view showing an inrush current and overcurrent protection related to a prior art.

As a conventional motor-driven blower, there has been known one having an overcurrent protecting function which determines an inrush current (overshoot current) and an unusual or improper current at its startup. In this type of motor-driven blower, a current I that flows through a brushless motor of the motor-driven blower, increases instantaneously but decreases with time upon the startup of the motor-driven blower as shown in FIG. 12. On the other hand, when the brushless motor is overloaded continuously or the motor-driven blower is brought into a locked state, an excessive current continues to flow.

Therefore, an overcurrent detected value Iz and an overcurrent detected time Tz are set and detected simultaneously. By doing so, the inrush current at the startup and the improper current can be discriminated or determined. Namely, if Tz<Tb is taken when Iz<I, then the improper current is found to have occurred and the current is interrupted. Various circuit configurations each having such a function has heretofore been proposed.

According to such means, however, a large current will flow upon the startup of the motor-driven blower while the time is exactly short, thus applying a load to each of electronic parts on an electric circuit. Therefore, there has been proposed a technology, which suppresses the inrush current at the startup as much as possible. There is known, for example, a method disclosed in Unexamined Patent Publication No. Sho 62(1987)-272877, wherein a signal having a short pulse width is outputted in a PWM inverter device only for a predetermined time upon the startup of the motor-driven blower to start up the motor-driven blower.

However, Unexamined Patent Publication No. Sho 62(1987)-272877 does not disclose any specific means for outputting the signal having the short pulse width upon the startup of the motor-driven blower.

SUMMARY OF THE INVENTION

An object of the present invention is to provide means easy to be implemented as means for PWM-controlling a current to be supplied to an electric motor so as to decrease upon startup of the electric motor, and provide means which reduces an inrush current (overshoot current) at the startup of the electric motor, particularly reduces an on-startup inrush current, which is suitable for an application like a motor-driven blower.

The object of the present invention is achieved by the novel PWM control device, motor-driven blower and electric vacuum cleaner of the present invention.

The present invention provides a PWM control device wherein a microprocessor determines a pulse width of a PWM signal through the use of a signal detected by rotation position detecting means which detects the rotational position of a rotor of a brushless motor, with respect to the amount of each current supplied from an inverter circuit for driving the brushless motor to the brushless motor to thereby perform PWM control. Under the PWM control, the microprocessor enlarges the pulse width of the PWM signal during an interrupt processing or process including a process for detecting the rotational position by the rotation position detecting means upon startup of the brushless motor and gradually enlarges the pulse width of the PWM signal according to the repetition of the interrupt processing, thereby making it possible to easily limit or suppress an inrush or overshoot current with respect to each current supplied to the motor upon startup of the motor.

The present invention according to another aspect provides a motor-driven blower which includes a brushless motor, an air blower rotatably driven by the brushless motor, an inverter circuit which drives the brushless motor, rotation position detecting means which detects a rotational position of rotor of the brushless motor, and a PWM control device wherein a microprocessor determines a pulse width of a PWM signal through the use of a signal detected by the rotation position detecting means, with respect to the amount of each current supplied from the inverter circuit to the brushless motor to thereby perform PWM control. Under the PWM control, the microprocessor enlarges the pulse width of the PWM signal during interrupt processing including a process for detecting the rotational position by the rotation position detecting means upon startup of the brushless motor and gradually enlarges the pulse width of the PWM signal according to the repetition of the interrupt processing, thereby making it possible to easily limit or suppress an inrush or overshoot current with respect to each current supplied to the motor upon startup of the motor.

The present invention according to a further aspect provides a cleaner comprising a brushless motor, an air blower rotatably driven by the brushless motor, an inverter circuit which drives the brushless motor, rotation position detecting means which detects a rotational position of rotor of the brushless motor, and a PWM control device wherein a microprocessor determines a pulse width of a PWM signal through the use of a signal detected by the rotation position detecting means, with respect to the amount of each current supplied from the inverter circuit to the brushless motor to thereby perform PWM control. Under the PWM control, the microprocessor enlarges the pulse width of the PWM signal during interrupt processing including a process for detecting the rotational position by the rotation position detecting means upon startup of the brushless motor and gradually enlarges the pulse width of the PWM signal according to the repetition of the interrupt processing, thereby making it possible to easily limit or suppress an inrush or overshoot current with respect to each current supplied to the motor upon startup of the motor.

DETAILED DESCRIPTION OF THE INVENTION

One embodiment of the present invention will be described.

A motor-driven blower illustrating an embodiment of the present invention will first be described.

Figure 1:
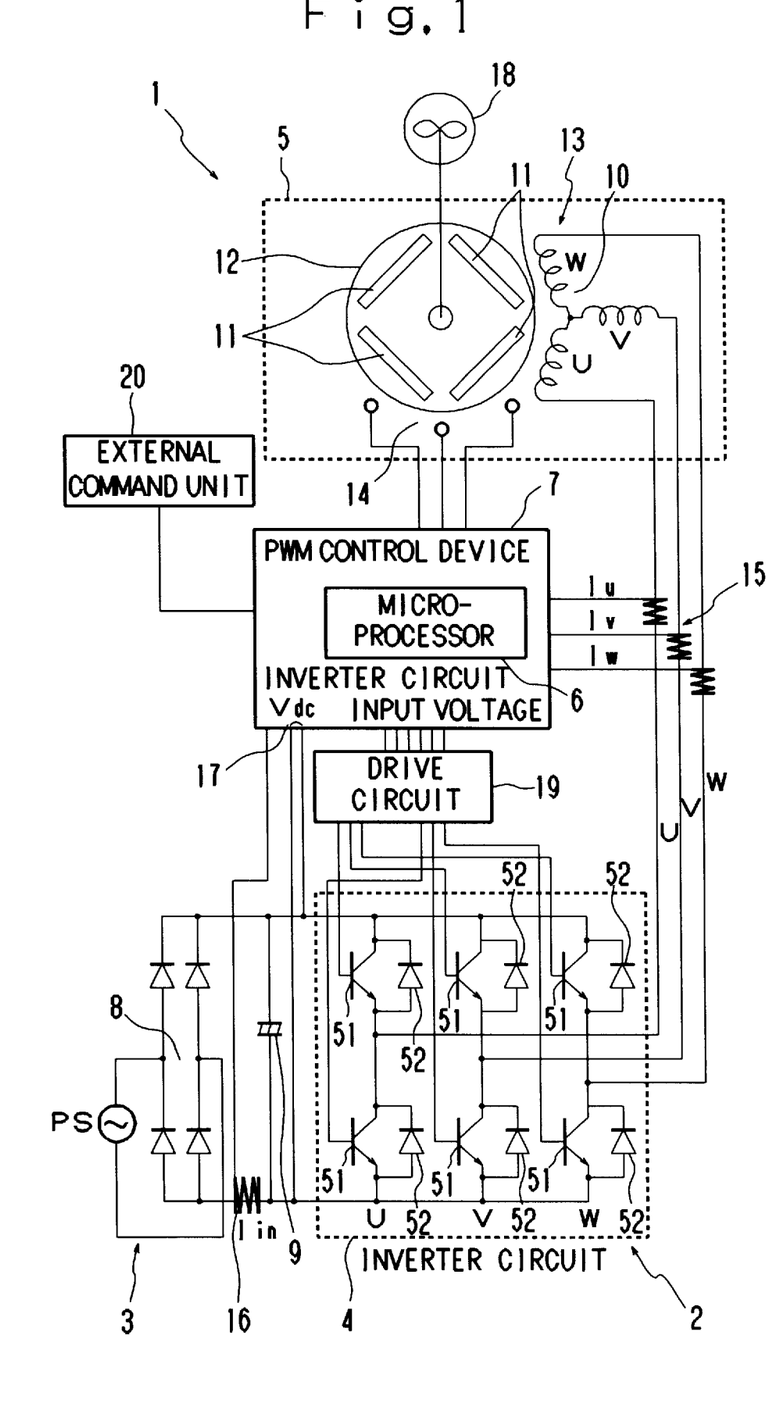
FIG. 1 is a circuit diagram showing a drive control circuit of a motor-driven blower.

FIG. 1 is a circuit diagram showing a drive control circuit 2 of the motor-driven blower 1. The drive control circuit 2 is a device which rotatably drives a brushless motor 5 of the motor-driven blower 1 in response to a high-frequency current generated from an inverter circuit 4 high-frequency driven with a power source 3 as a drive source. The drive control circuit 2 drives and controls the inverter circuit 4 under a PWM control device 7 for performing PWM (Pulse Width Modulation) control using a microprocessor 6. The details of the respective parts or components of the drive control circuit 2 will be explained below.

The power source 3 converts an AC voltage generated from a commercial AC power supply PS to a DC voltage under rectifying/smoothing effects of a rectifier circuit 8 and a smoothing condenser 9. The DC voltage is supplied to the inverter circuit 4.

The inverter circuit 4 has six semiconductor switching elements 51 connected in three-phase bridge form, and diodes 52 respectively parallel-connected to the semiconductor switching elements 51. For example, power transistors can be used as the semiconductor switching elements 51. The inverter circuit 4 is controlled based on a PWM signal outputted from the PWM control device 7 configured with the microcomputer 6 as the center and supplies an AC current to each of armature windings 10 of the brushless motor 5.

The brushless motor 5 is of a three-phase brushless DC motor and includes a rotor 12 in which permanent magnets 11 provided in two-pole pairs are embedded, and a stator 13 having the plurality of armature windings 10. A core of the rotor 12 is made up of silicon steel or the like having high permeability.

The drive control circuit 2 of the motor-driven blower 1 is provided with a rotor position detecting means 14 for detecting a rotational or angular position of the rotor 12. Such a rotor position detecting means 14 can be implemented by three magnetic sensors placed at intervals of electrical angles equal to 120, for example. As the magnetic sensors, a hole sensor, a hole IC, etc. may be used, The rotor position detecting means 14 can be implemented by using an optical pulse encoder or even by detecting a voltage induced in the corresponding armature winding 10 during a de-energization period in which no current is caused to flow through the corresponding armature winding 10. When such a rotor position detecting means 14 detects magnetic pole positions at every predetermined interval of the rotor 12, the microprocessor 6 of the PWM control device 7 computes the rotation velocity of the rotor 12 and current-carrying or conduction timings provided for the respective phases by use of the magnetic pole positions indicative of information detected by the rotor position detecting means 14, and supplies suitable currents to the armature windings 10 of the stator 13, thereby generating a revolving field.

Further, the drive control circuit 2 of the motor-driven blower 1 is provided with an armature current detecting means 15 for detecting currents that flow through the armature windings 10 in the brushless motor 5. The armature current detecting means 15 detects the currents that flow through the armature windings 10 of the brushless motor 5. The armature current detecting means 15 comprises three current sensors for respectively detecting currents Iu, Iv and Iw flowing through the windings for the respective phases of U, V and W, and a circuit for detecting voltages applied across three resistors.

The drive control circuit 2 of the motor-driven blower 1 includes an inverter circuit current detecting means 16 for detecting a current Iin flowing through the inverter circuit 4, and an inverter circuit input voltage detecting means 17 for detecting a voltage Vdc inputted to the inverter circuit 4 both of which are used as means different from the armature current detecting means 15 for detecting the currents flowing through the armature windings 10. The inverter circuit current detecting means 16 comprises a current sensor, and such a circuit that a voltage applied across a resistor interposed and connected between the rectifier circuit 8 and the smoothing condenser 9 is detected by means of the PWM control device 7. On the other hand, the inverter circuit input voltage detecting means 17 is configured as a physical quantity detecting means for detecting a voltage Vdc inputted to the inverter circuit 4. The inverter circuit input voltage detecting means 17 comprises such a circuit that the voltage Vdc rectified and smoothed by the rectifier circuit 8 and the smoothing condenser 9 and inputted to the inverter circuit 4 is detected by the PWM control device 7.

Figure 2A:
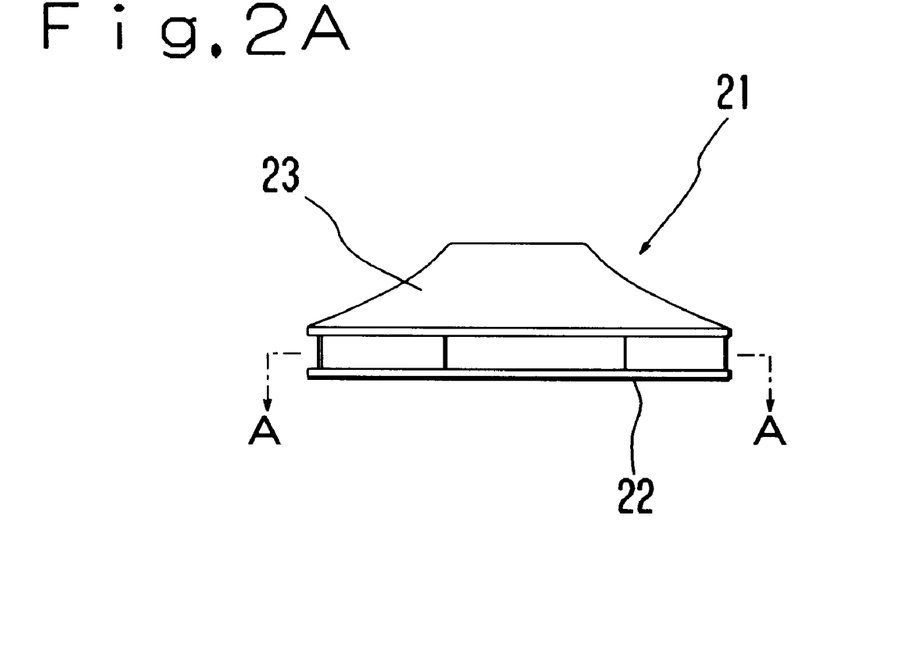
FIGS. 2(a) and 2(b) are schematic diagrams illustrating an impeller of a centrifugal air blower.
Figure 2B:
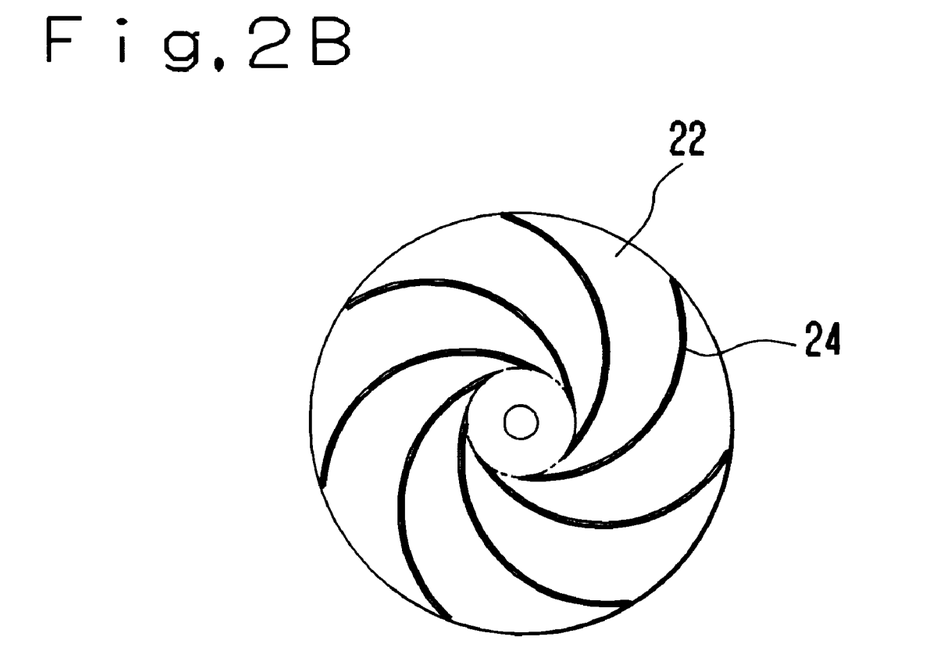

FIGS. 2(a) and 2(b) are schematic diagrams showing the form of an impeller 21 included in a centrifugal air blower 18, in which FIG. 2(b) is a diagram as cut along line A—A of FIG. 2(a) and seen in the direction indicated by arrows. Such centrifugal air blower 18 has heretofore been in wide use as for an electric vacuum cleaner. The impeller 21 comprises a main plate 22, a side plate 23 and a plurality of vanes or blades 24. The vanes 24 have a plurality of convex portions formed thereon, which are respectively fit and fastened up in their corresponding holes defined in the main plate 22 and the side plate 23 and which are fixed therein.

A description will next be made of control of the brushless motor 5 by the PWM control device 7. Control sharing the use of the hardware configuration of the motor-driven blower 1 will be described herein.

Figure 3:
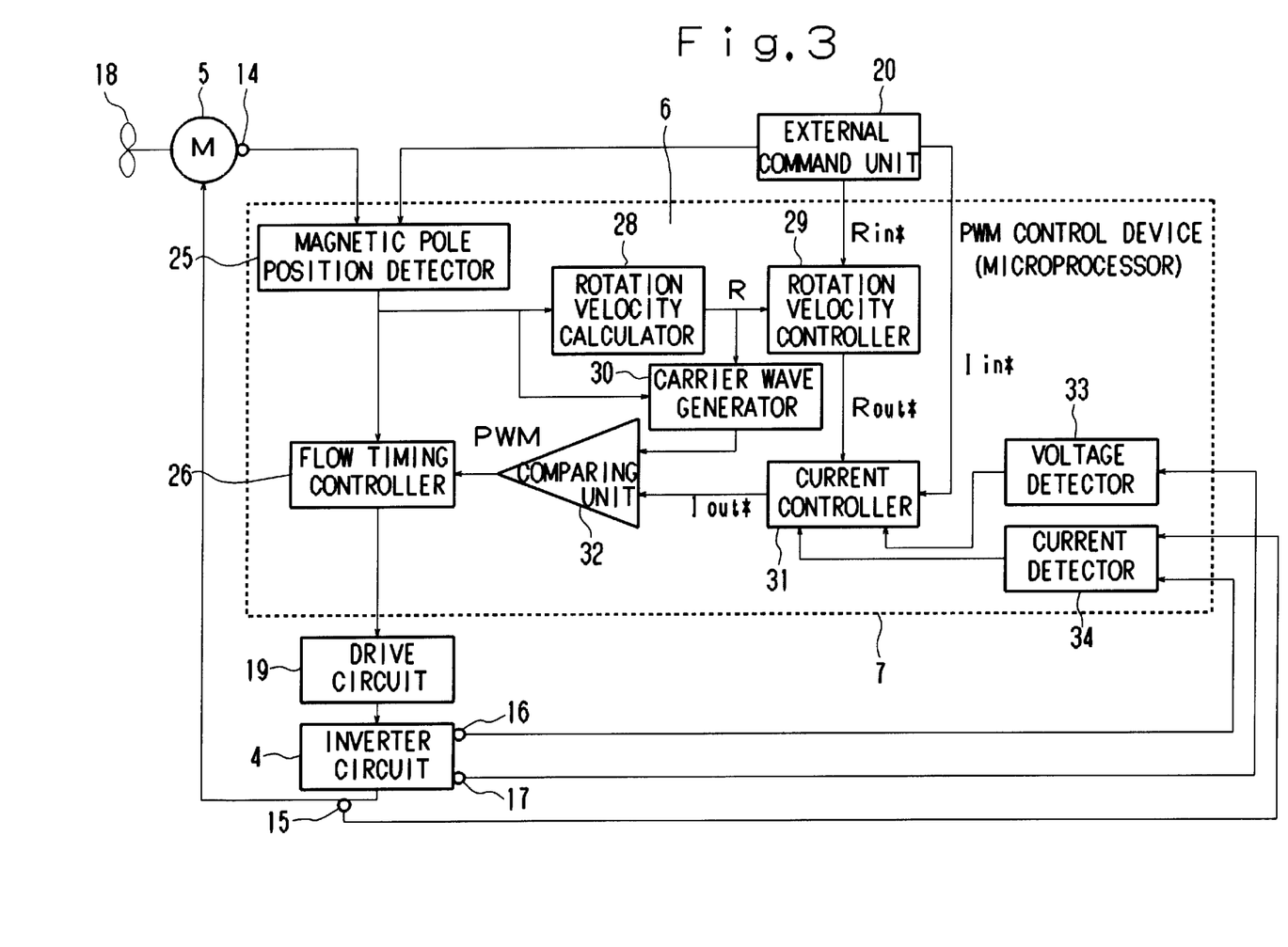
FIG. 3 is a function block diagram showing a configuration of a PWM control unit according to control of the motor driven blower.

FIG. 3 is a function block diagram for describing the function of the circuit shown in FIG. 1. The microprocessor 6 included in the PWM control device 7 includes a CPU for executing various computing processes and concentratedly controlling respective parts of the motor-driven blower 1, and various memories. The microprocessor 6 executes a predetermined computing process and an input/output process of various signals in accordance with operation programs stored in each memory to thereby control the respective parts of the motor-driven blower 1. The function block diagram shown in FIG. 3 principally illustrates the function of the microprocessor 6 in the form of blocks.

On the basis of an instruction issued from an external command unit 20, the PWM control device 7 basically detects magnetic pole positions of the rotor 12 of the brushless motor 5 in the motor-driven blower 1, offers timing provided to supply a current to each phase of the brushless motor 5 and outputs a PWM signal to the drive circuit 19.

As functional elements constituting such a PWM control device 7, the PWM control device 7 includes detectors 25, 33 and 34 for respectively detecting physical quantities related to the motor-driven blower 1, such as magnetic pole positions of the rotor 12, a voltage and each current inputted to the inverter circuit, etc., a flow timing controller 26, a rotation velocity calculator 28, a rotation velocity controller 29, a current controller 31, a carrier wave generator 30, and a comparator or comparing unit 32. The CPU of the microprocessor 6 implements all or some of the functions of these respective parts, based on software stored in the memories of the microprocessor 6. For instance, the rotation velocity calculator 28, the rotation velocity controller 29, etc. can be implemented by processes executed by the CPU of the microprocessor 6, whereas the carrier wave generator 30, current controller 31, comparing unit 32, etc. can be implemented by digital circuits.

A basic function of the PWM control device 7 is as follows. The current controller 31 generates a current control output value Iout*, based on a current instruction value Iin* supplied from the external command unit 20 and used for specifying the amount of each current supplied from the inverter circuit 2 to the brushless motor 5, and detected values of the physical quantities related to the motor-driven blower 1. Further, the comparing unit 32 compares the current control output value Iout* and a signal having a predetermined waveform, a triangular wave signal in the present example, outputted from the carrier wave generator 30, which signal is used as a comparison reference, and outputs the result of comparison as a PWM signal. A suitable PWM signal is generated according to this PWM signal and a signal for the timing provided to supply the current to each phase, i.e., flow timing, which is supplied from the flow timing controller 26 on the basis of each detected value of a magnetic pole position detector 25.

In response to the PWM signal generated in this way, the drive circuit 19 selectively drives and controls the semiconductor switching elements in the inverter circuit 4. As a result, high-frequency voltage outputs are supplied to their corresponding armature windings 10 of the motor 5 to drive the brushless motor 5.

The function of the rotation velocity controller 29 will next be described. The rotation velocity controller 29 compares a rotation-velocity calculated value R calculated from each time-variation in angle detected by the rotor position detecting means 14 of the rotor 12 with the upper-limit rotational velocity of the rotor 12, which is determined according to a mechanical strength or the like. When the rotation-velocity calculated value R exceeds the upper-limit rotational velocity, the rotation velocity controller 29 controls the rotation velocity of the rotor 12 so as to be limited to within the upper-limit rotational velocity.

Further, the rotation velocity controller 29 serves as a proportional integral control system, for example. On the basis of the command of the external command unit 20, the microprocessor 6 recognizes various drive modes and subtracts a rotation-velocity calculated value R, which is calculated from an angle detected by the rotor position detecting means 14 of the rotor 12 and a time variation in the angle, from a rotation velocity instruction value Rin* recognized according to each of the various modes. Thus, a rotation velocity output value Rout* is obtained using an operation based on the following expression (1) by reference to the result of subtraction.

$$\text{Rout}^*_k = \text{Rout}^*_{k-1} + K_p(E_k - E_{k-1}) + K_i \cdot T \cdot E_{k-1} \qquad (1)$$

In the expression (1), Rout* indicates a rotation velocity output value, E indicates an error between a rotation velocity instruction value Rin* and a rotation-velocity calculated value R, Kp indicates a proportional gain, Ki indicates an integral gain, and T indicates a detection cycle or period of a rotation velocity, respectively.

The current controller 31 generates a current control output value Iout*, based on a rotation velocity control output value Rout* supplied from the rotation velocity controller 29 and detected values of physical quantities related to the motor-driven blower 1, in the present embodiment, a physical quantity of the input and/or output of the inverter circuit 4. Namely, in the present embodiment, the voltage detector 33 and the current detector 34 respectively detect voltages and currents inputted to the inverter circuit 4 and currents outputted therefrom by using the armature current detecting means 15, the inverter circuit current detecting means 16 and the inverter circuit input voltage detecting means 17, and output their detected signals to the current controller 31. The current control output value Iout* is inputted to the comparing unit 32 for comparison, and a triangular wave signal from the carrier wave generator 30 is supplied as a comparison reference, whereby a PWM waveform is taken out at the output of the comparing unit 32. A suitable PWM signal is generated according to the PWM waveform and each of flow timings for the respective phases, which is supplied from the flow-timing controller 26.

In a manner similar to the above, the drive circuit 19 selectively drives and controls the semiconductor switching elements in the inverter circuit 4 in response to the generated PWM signal. As a result, high-frequency voltage outputs are supplied to their corresponding armature windings 10 of the brushless motor 5 to drive the brushless motor 5.

In such a configuration as described above, the brushless motor 5 constituting the motor-driven blower 1 is rotatably driven by currents outputted from the inverter circuit 4, so that the impeller 21 is rotated. The motor-driven blower 1 sucks fluid, e.g., air under the rotation of the impeller 21. At this time, the brushless motor 5 is rotatably driven in an optimum state according to the state of the external command unit 20, the rotational or angular position of the rotor 12 of the brushless motor 5, the currents flowing in the inverter circuit 4, etc.

Figure 4:
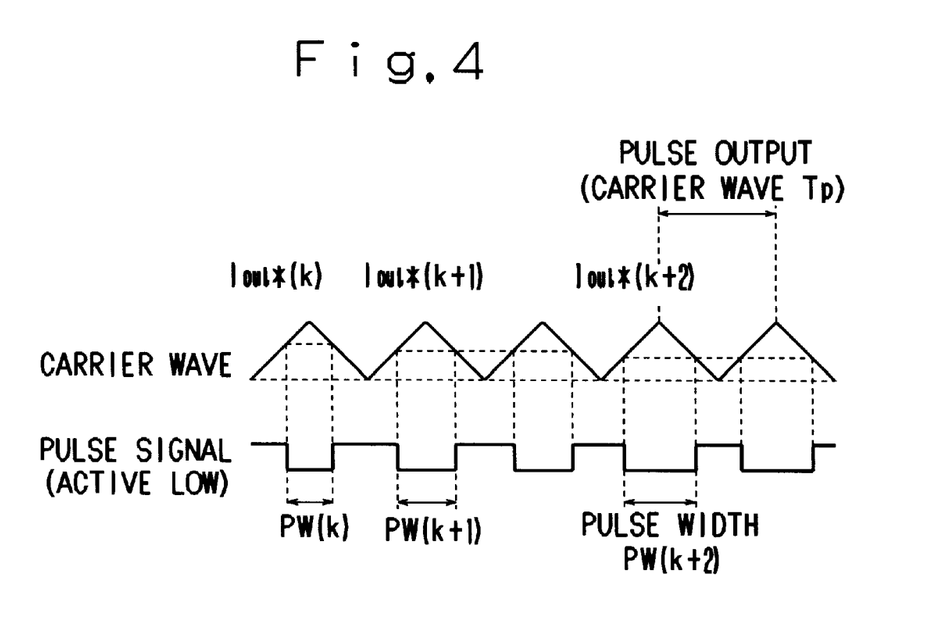
FIG. 4 is a timing chart showing a PWM signal and a carrier wave signal.

FIG. 4 is a timing chart illustrating the relationship between a carrier wave signal of PWM outputted from the carrier wave generator 30 and a PWM signal outputted from the PWM control device 7. The microprocessor 6 generates an interrupt signal in a certain predetermined cycle or period or is supplied with an interrupt signal from the outside, and starts interrupt processing including the detection of a rotational or angular position in response to the interrupt signal as a trigger. As described above, the microprocessor 6 processes a rotation velocity calculation, rotation velocity control, the detection of each physical quantity, current control, etc. and calculates or computes a current control output value Iout*.

The current control output value Iout* is inputted to the comparing unit 32 used as a PWM generating unit for the purpose of comparison, and a carrier wave of a period Tp is supplied from the carrier wave generator 30 as a comparison reference, whereby a PWM waveform is taken out at the output of the comparing unit 32. When the value of the carrier wave signal reaches the current control output value Iout* or more in the example illustrated in FIG. 4, the PWM signal is taken active, in the present example, it goes active low. Accordingly, an output period of the PWM signal also reaches Tp. Thus, the output value of the current controller 31 is reflected on each pulse width and thereby the amount of a current flowing through each armature winding 10 is controlled, whereby the motor-driven blower 1 having a desired output is obtained.

Incidentally, the period Tp of the carrier wave supplied from the carrier wave generator 30 is variable and the value of the carrier wave may be reset (to zero) in a desired timing. When the value of the carrier wave signal is reset where, for example, an interrupt signal is produced in accordance with each drive mode of the motor-driven blower 1, the number of pulses outputted from the PWM control device 7 can more accurately be controlled.

Figure 5A:
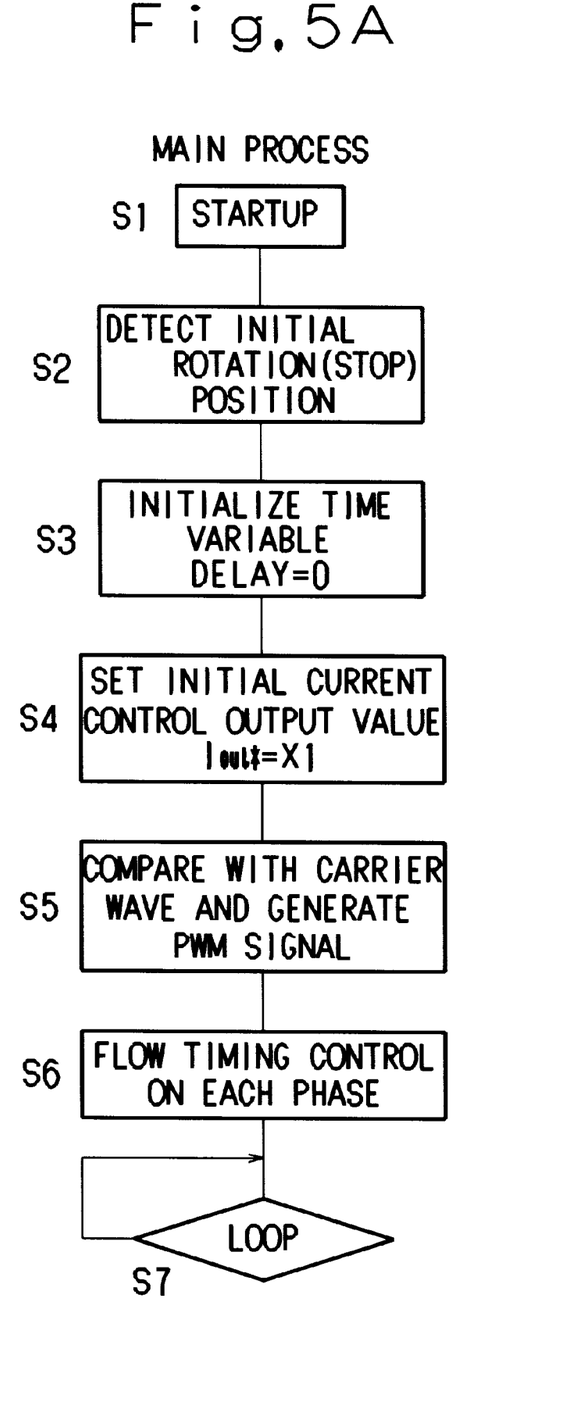
FIGS. 5(a) and 5(b) are flowcharts illustrating the operation of the PWM control unit at the startup of the motor-driven blower.
Figure 5B:
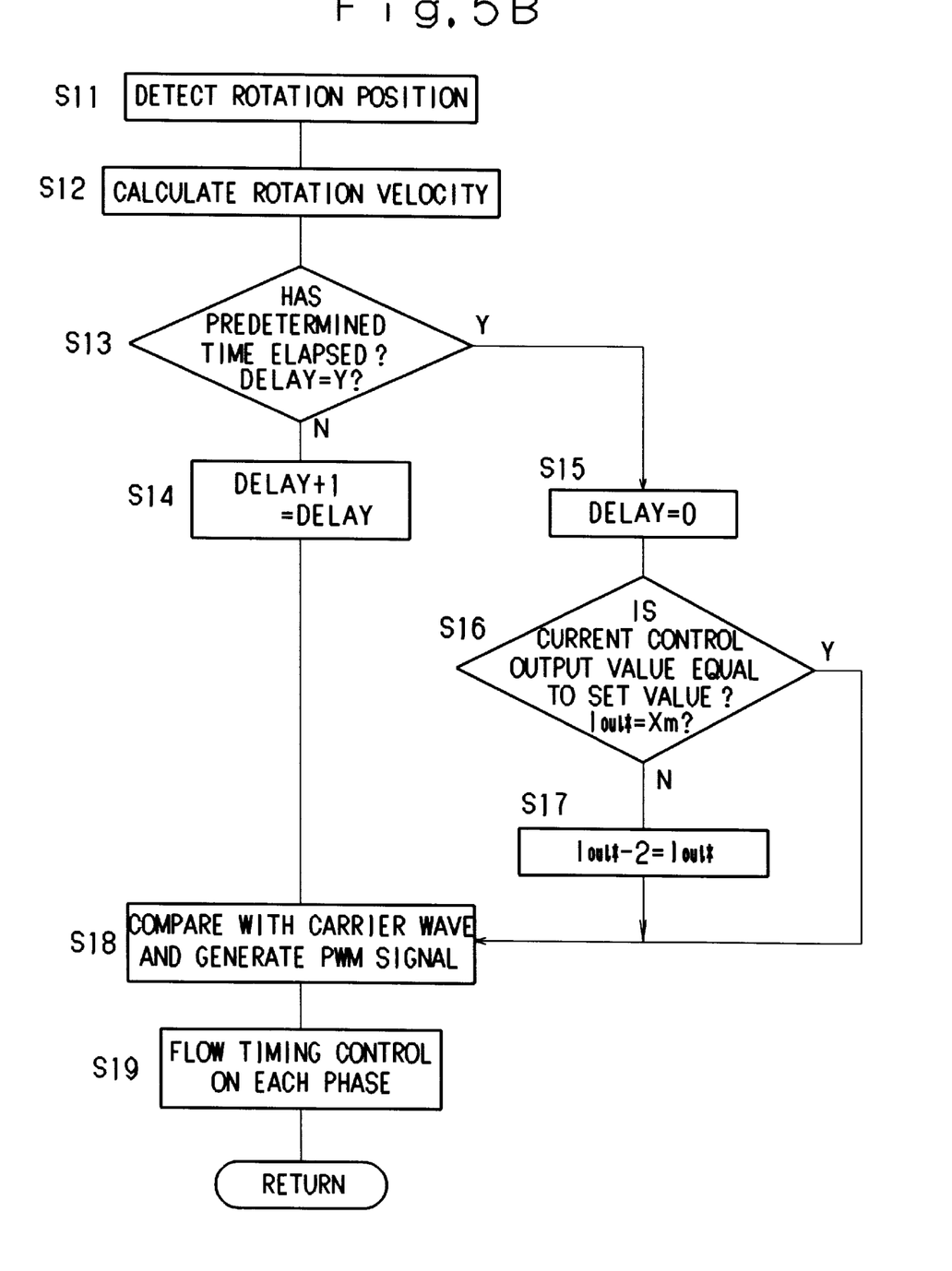

FIGS. 5(a) and 5(b) are flowcharts showing an example of operation control at the startup of the PWM control device 7, principally, the microprocessor 6. The description of the settings of various registers and flags, a method for generating a carrier wave, etc. is omitted.

On the basis of an instruction supplied from the external command unit 20 or the like, the PWM control device 7 first detects the rotational position of the rotor 12 of the brushless motor 5 (Step S2) upon startup of the motor-driven blower 1 (Step S1) as shown in FIG. 5(a). Next, the PWM control device 7 sets an initial value X1 of a current control output value Iout* (Step S4). This initial value X1 is set higher than a target or intended set value Xm. Further, the current control output value Iout* and a carrier wave signal are compared and thereby a PWM signal is generated (Step S5). Thereafter, a PWM signal corresponding to a suitable phase is outputted based on the previously-detected stop position of the rotor 12 (Step S6) The inverter circuit 4 is operated based on the PWM signal so that the rotor 12 starts to rotate.

Afterwards, the PWM control device 7 appropriately performs interrupt processing for detecting each rotational position of the rotor 12 according to a timer signal used inside the microprocessor 6 or a signal sent from outside as shown in FIG. 5(b) and outputs a PWM signal corresponding to each suitable phase, based on its detected value (Steps S11 through 19).

Namely, when the motor-driven blower 1 is started up, the current control output value Iout* for comparison with the carrier wave signal is changed to increase a pulse width of the PWM signal during the interrupt processing (Step S11, S12) for detecting the rotational position of the rotor 12. Such processing makes it possible to smoothly increase the pulse width of the PWM signal each time each rotational position of the rotor 12 is detected, and allows a reduction in inrush current upon the startup of the motor-driven blower 1. Further, since this may simply be added to the interrupt processing for detecting each rotational or angular position of the rotor 12, required to rotate and control the motor-driven blower 1, the setting of new interrupt processing is unnecessary, software is not complex in configuration either, and the memory capacity is saved.

The currents that flow through the armature windings 10 are detected by the armature current detecting means 15 and the inverter circuit current detecting means 16. When each of the detected values of currents exceeds an overcurrent detected value preset to a value larger than the inrush current at the startup, the brushless motor 5 stops rotating. It is thus possible to improve the reliability of each electronic component of the drive control circuit 2.

Upon the processes shown in FIG. 5, a time variable DELAY is used (Step S3). Each time a predetermined time elapses when the brushless motor 5 is started up (Step S13), the current control output value Iout* (variable) is monotonously reduced so as to reach Iout*−2=Iout* until the current control output value Iout* reaches a predetermined value Xm (Steps S15 through S17). Further, the pulse width PW of the PWM signal is monotonously increased (Step S14). Thus, the pulse width PW is enlarged for each interrupt processing, and the pulse width PW is enlarged by degrees upon the startup of the brushless motor 5.

Figure 6:
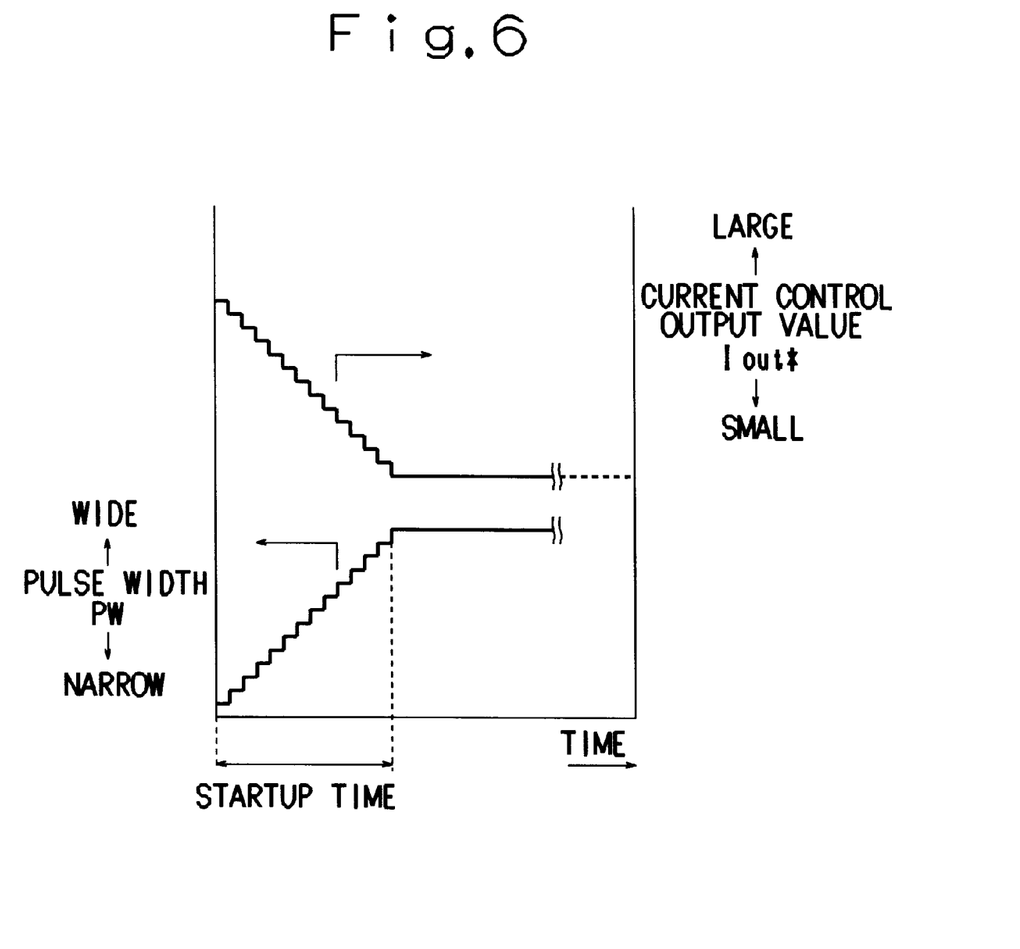
FIG. 6 is an explanatory view showing the relationship between time, a current control output value Iout* and a pulse width PW at the startup of the motor-driven blower.

The relationship between the time, current control output value Iout* and pulse width PW at the startup thereof is illustrated in FIG. 6. The method of monotonously decreasing the current control output value Iout* in this way and monotonously increasing the pulse width of the PWM signal allows easy settings and a reduction in inrush current. Incidentally, it is needless to say that the degree of monotonously decreasing the current control output value Iout* can be set in large numbers within the scope not departing from the spirit of the present invention.

Figure 7:
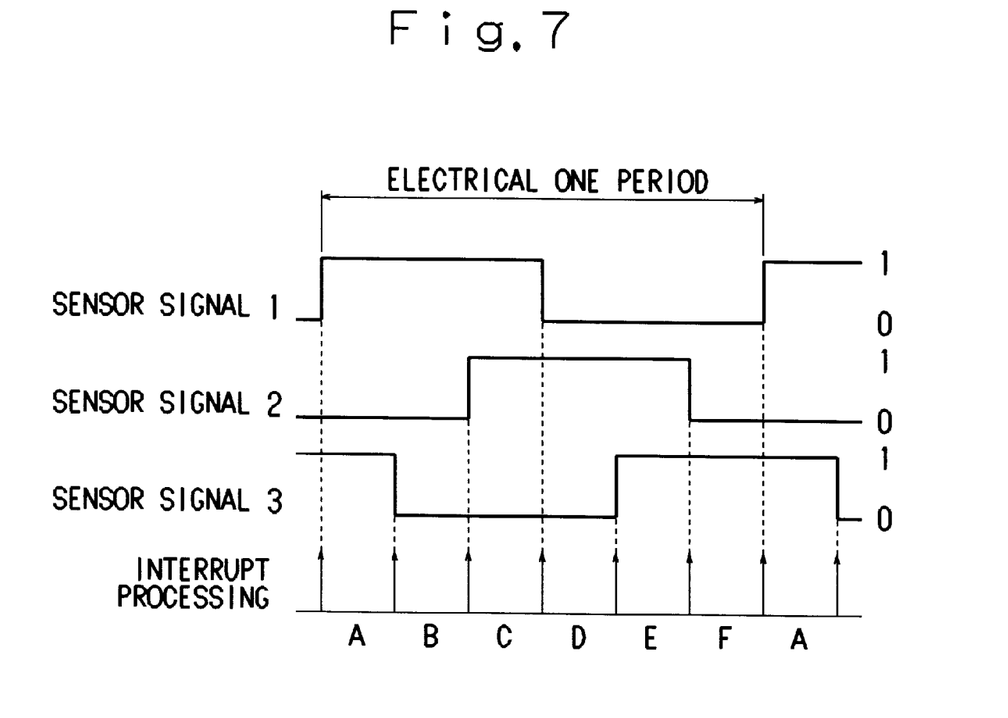
FIG. 7 is an explanatory view showing the relationship between signals for magnetic sensors and each interrupt processing.

FIG. 7 shows a state in which when hole ICs are used as the rotor position detecting means 14 and the three hole ICs are placed in the stator 13 at intervals of electrical angles equal to 120°, signals are outputted from the hole ICs and interrupt processes occur according to the edges of the signals outputted from the hole ICs. According to this method, when the rotor 12 starts to rotate, the interrupt processes are automatically started every electrical angles of 60°, and the pulse width of the PWM signal is increased together with the rotation position detecting process. Since the microprocessor 6 needs not perform the generation of interrupt signals from the timer and the like, the interrupt processes can easily be set. Since the interval of occurrence of the interrupt processes becomes short with a rise in revolution speed or the number of revolutions, and when the revolution speed at the startup is low in reverse, the time necessary for the each interrupt processing to occur becomes also long. Therefore, the degree of an increase in pulse width can be made slope easily at the beginning of the startup.

Figure 8:
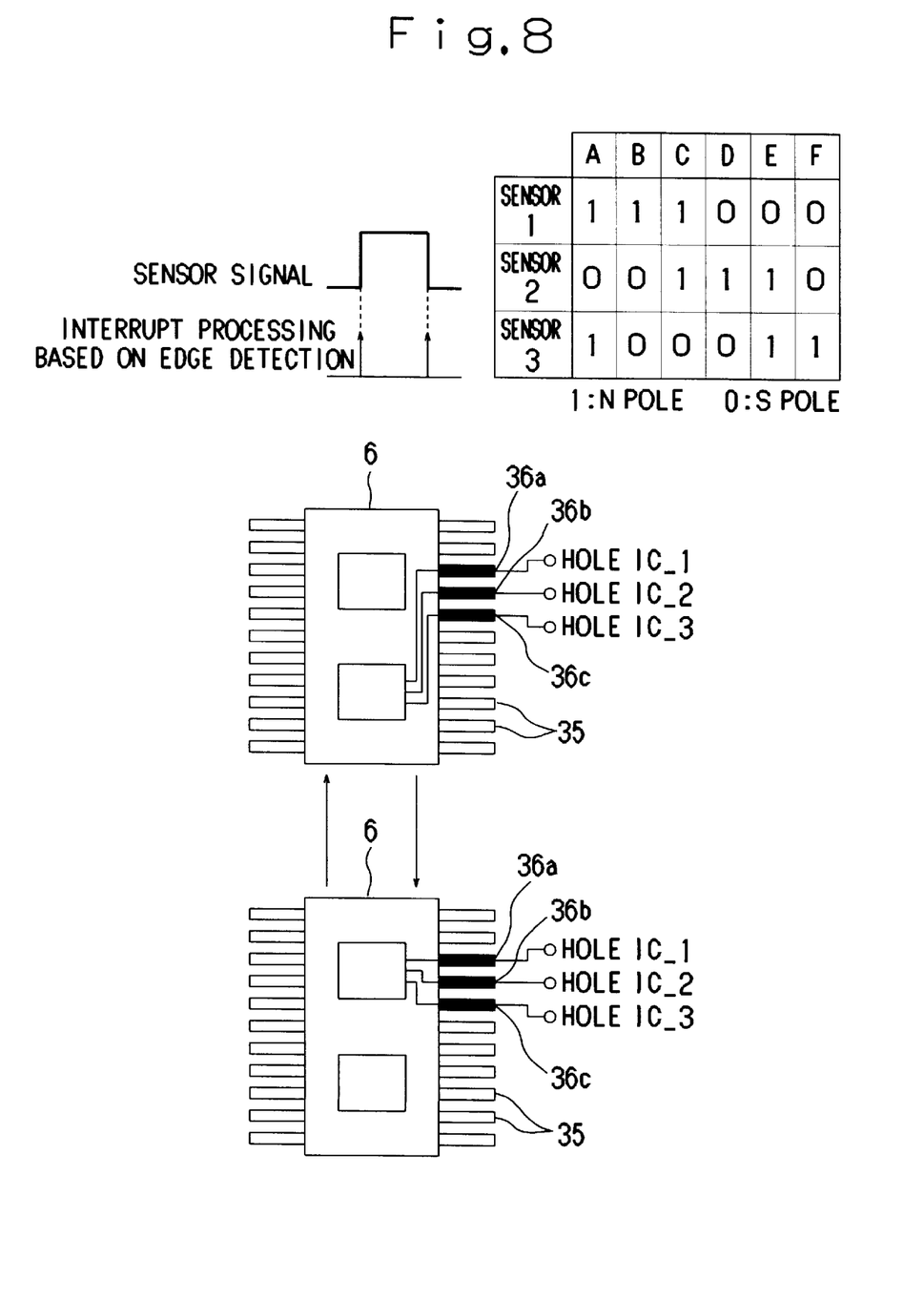
FIG. 8 is an explanatory view illustrating functions of terminals for a microprocessor.
Figure 9:
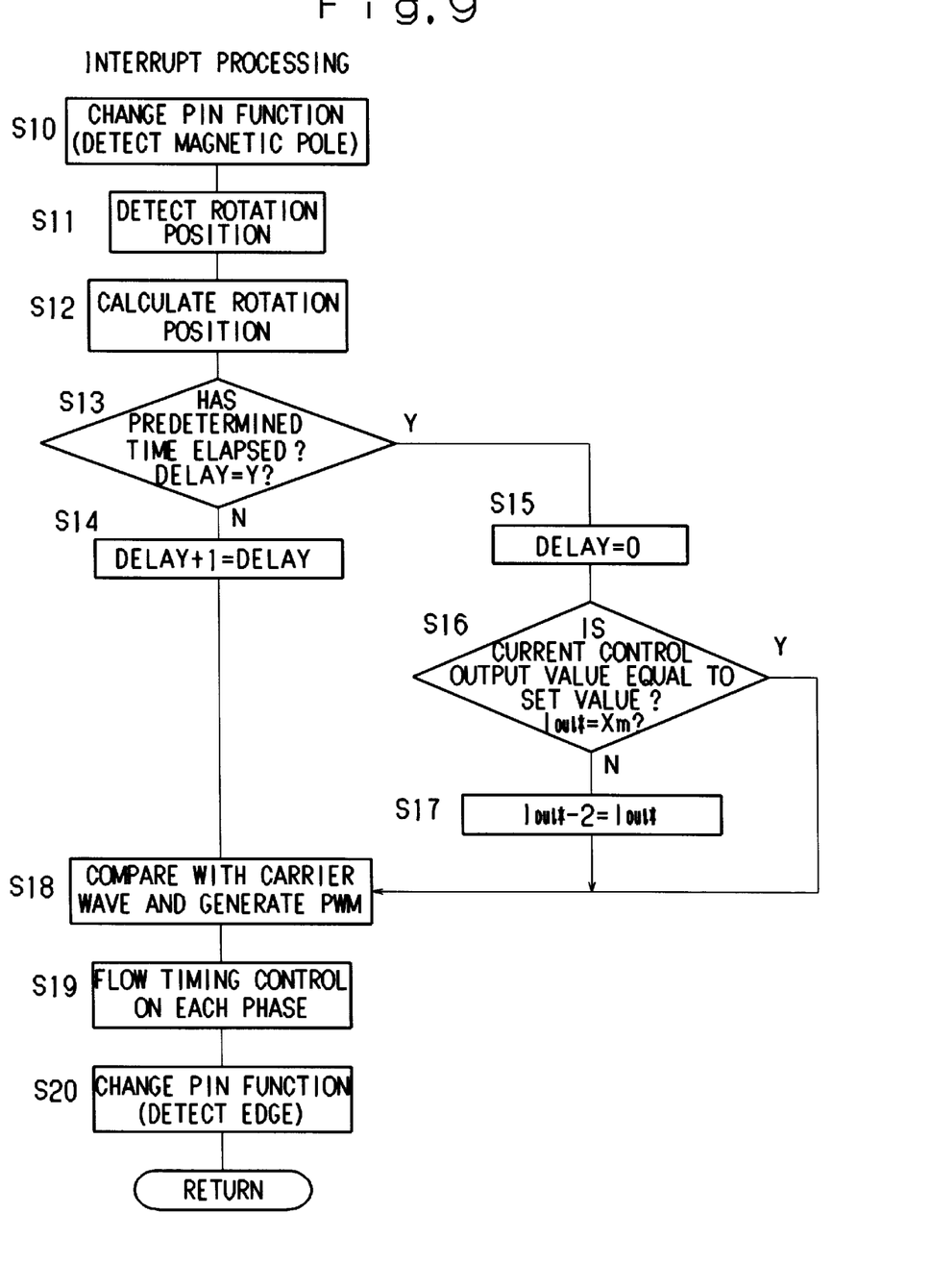
FIG. 9 is a flow chart showing an interrupt processing operation including changes made to the functions of the terminals for the microprocessor.

FIG. 8 is a diagram which describes functions of terminals 36a through 36c of the microprocessor 6 to which the signals outputted from the hole ICs are inputted, and FIG. 9 is a flowchart showing operation control for performing switching between the functions of the terminals 36a through 36c during interrupt processing. The terminals 36a through 36c are respectively provided with the functions of firstly detecting the edges of signals of a hole IC1 through a hole IC3 and thereby generating interrupt signals. During the interrupt processing, the position of each magnetic pole is switched to a detecting function (Step S10) during the interrupt processing. When the magnetic position detection is completed, the routine process is returned to the function of detecting the edges of the signals outputted from the hole IC1 through hole IC3 (Step S20). Effectively using the terminals 36a through 36c receiving therein the signals outputted from the rotor position detecting means 14 in this way eliminates for the need for new wirings to be provided between the microprocessor 6 and the sensors and makes it possible to reduce the total number of terminals 35 of the microprocessor 6.

Figure 10:
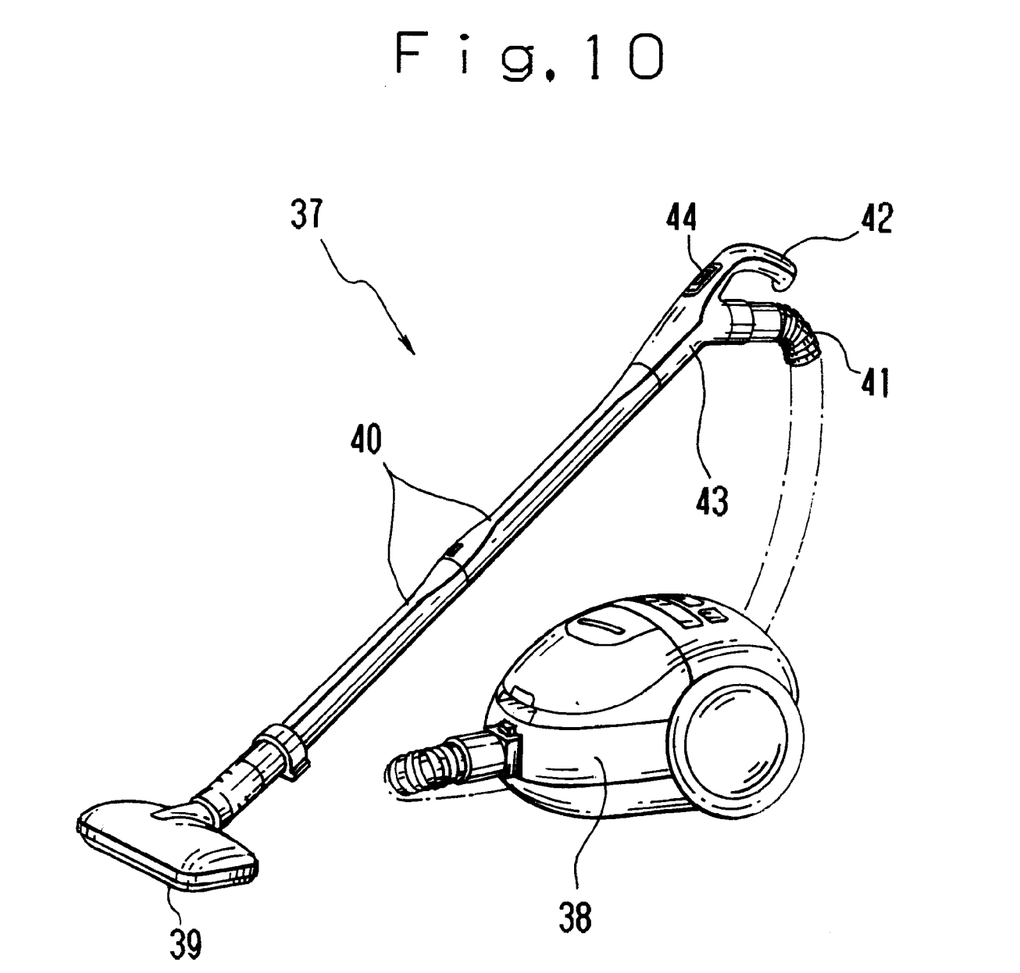
FIG. 10 is a perspective view showing an external configuration of an electric vacuum cleaner.

The aforementioned PWM control device 7 and motor-driven blower 1 can be mounted to an electric vacuum cleaner. FIG. 10 is a perspective view showing an external configuration of an electric vacuum cleaner 37. The present electric vacuum cleaner 37 has a configuration wherein a hose 41 to which a two-division configured extension pipe 40 having a leading end portion to which a suction or inlet body 39 is detachably fit, is detachably connected, is detachably mounted to a housing 38 which constitutes a base of the electric vacuum cleaner 37.

A motor-driven blower 1 comprising a brushless motor 5, an air blower 18, etc. is built in the housing 38. The hose 41 is connected to the housing 38 in such a manner that a base end thereof communicates with the suction side of the motor-driven blower 1 through an unillustrated dust chamber. A hand control 43 having such a form as to branch from the hose 41 backward is provided at the leading end or tip of the hose 41. In the hand control 43, a free end portion of the leading end thereof that branches from the house 41 backward, serves as a grip or grip portion 42, and a control button 44 is provided at a position where it can be operated with the thumb of an operator who grasps the grip 42. The control button 44 doubles as a power switch for the motor-driven blower 1. Further, the control button 44 is configured so as to be capable of selecting and setting a plurality of types of operation modes for respectively bringing the motor-driven blower 1 to driven states different from one another. Namely, the control button 44 is capable of switching the operation mode to four stages of "stop", "low", "medium" and "high", for example. According to the selection of the operation mode by the control button 44, the external command unit 20 outputs a different current instruction value Iin* to the PWM control device 7. Further, the two-division configured extension pipe 40 having the tip or leading end to which the inlet body 39 is detachably mounted, is detachably mounted to the hand control 43.

The electric vacuum cleaner 37 needs to increase the rotational speed of the motor-driven blower 1 to about 40000 to 50000 rpm in about 1 to 3 seconds as a startup time. The motor-driven blower 1 for such an electric vacuum cleaner 37 is so effective at triggering the edge of each signal detected by the rotor position detecting means 14 to thereby perform each interrupt processing and increasing a pulse width of a PWM signal during the interrupt processing. That is to say, according to this method, when the rotor 12 starts to rotate, each interrupt processing is automatically started, and the interval of occurrence of the interrupt processes varies with the high or low rotational speed. Namely, when the rotational speed at the start is low, the time required to cause each interrupt processing is long. When the rotational speed is high, the interval of occurrence of the interrupt processes becomes short. Thus, when the inrush current is apt to increase at startup, it is possible to automatically make slow the degree of an increase in the pulse width and suppress the inrush current. The degree of the increase in pulse width is automatically accelerated since the peak of the inrush current passes over and starts to fall. It is also possible to increase the rotational speed to high rotational speeds ranging from 40000 rpm to 50000 rpm in a short period of time equivalent to a startup time of about 1 to 3 seconds.

Figure 11:
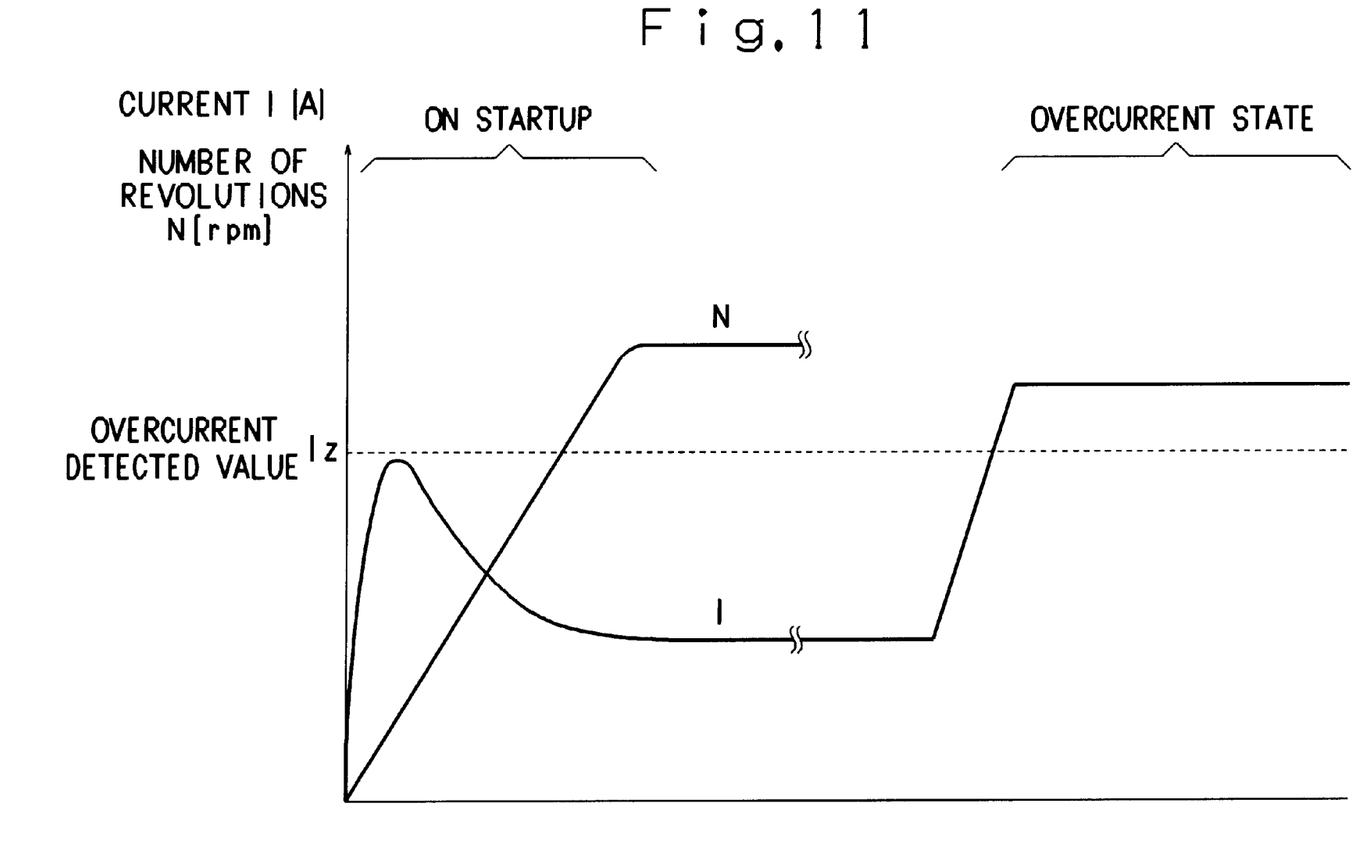
FIG. 11 is an explanatory view illustrating an inrush current and overcurrent protection.

According to the motor-driven blower 1 and electric vacuum cleaner 37 according to the present embodiment, the inrush current can be reduced as shown in FIG. 11. Namely, it is understood that in the example shown in FIG. 11 as compared with an example shown in FIG. 12, a current I that flows through the brushless motor 5 at startup of the motor-driven blower 1 is below an overcurrent detected value Iz and hence the inrush current decreases.

What is claimed is:

1. A PWM control device, comprising:

a microprocessor;

interrupt processing means which allows the microprocessor to execute a process for detecting a predetermined rotational position interval of a rotor of a brushless motor by use of rotation position detecting means according to interrupt processing;

PWM control means which allows the microprocessor to execute a process for outputting a PWM signal through the use of a detected signal of the predetermined rotational position interval with respect to the amount of each current supplied from an inverter circuit for driving the brushless motor to thereby cause the microprocessor to perform PWM control; and inrush current limiting means which allows the microprocessor to execute a process for enlarging the pulse width of the PWM signal during the interrupt processing upon the startup of the brushless motor and for progressively enlarging the pulse width of the PWM signal according to the repetition of the interrupt processing;

wherein the inrush current limiting means allows the microprocessor to execute a process for monotonously decreasing a value of a current control signal for determining the pulse width of the PWM signal by comparison with a predetermined repetitive waveform during the interrupt processing to thereby monotonously change the pulse width.

2. The PWM control device according to claim 1, wherein the inrush current limiting means allows the microprocessor to execute a process for stopping the rotation of the brushless motor when a current flowing through each of windings of the brushless motor exceeds an overcurrent detected value preset to a value larger than the inrush current at the startup of the brushless motor.

3. The PWM control device according to claim 1, wherein the interrupt processing means detects and triggers the edge of a signal detected by the rotation position detecting means to thereby allow the microprocessor to execute the interrupt processing.

4. The PWM control device according to claim 3, wherein the interrupt processing means allows the microprocessor to execute a process for switching the same terminals between the function of inputting the signal detected by the rotation position detecting means to the microprocessor and the function of generating the interrupt processing.

5. A motor-driven blower, comprising:

a brushless motor;

an air blower rotatably driven by the brushless motor;

an inverter circuit which drives the brushless motor;

rotation position detecting means which detects a predetermined rotational position interval of a rotor of the brushless motor;

a microprocessor;

interrupt processing means which allows the microprocessor to execute a process for detecting the predetermined rotational position interval of a rotor of the brushless motor by use of the rotation position detecting means according to an interrupt processing;

PWM control means which allows the microprocessor to execute a process for outputting a PWM signal through the use of a detected signal of the predetermined rotational position interval with respect to the amount of each current supplied from the inverter circuit to the brushless motor to thereby cause the microprocessor to execute PWM control; and inrush current limiting means which allows the microprocessor to execute a process for enlarging the pulse width of the PWM signal during the interrupt processing upon the startup of the brushless motor and for progressively enlarging the pulse width of the PWM signal according to the repetition of the interrupt processing;

wherein the inrush current limiting means allows the microprocessor to execute a process for monotonously decreasing a value of a current control signal for determining the pulse width of the PWM signal by comparison with a predetermined repetitive waveform during the interrupt processing to thereby monotonously changing the pulse width.

6. The motor-driven blower according to claim 5, wherein the inrush current limiting means allows the microprocessor to execute a process for stopping the rotation of the brushless motor when a current flowing through each of windings of the brushless motor exceeds an overcurrent detected value preset to a value larger than an inrush current at the startup of the brushless motor.

7. The motor-driven blower according to claim 5, wherein the interrupt processing means detects and triggers the edge of a signal detected by the rotation position detecting means to thereby allow the microprocessor to execute the interrupt processing.

8. The motor-driven blower according to claim 7, wherein the interrupt processing means allows the microprocessor to execute a process for switching the same terminals between the function of inputting the signal detected by the rotation position detecting means to the microprocessor and the function of generating the interrupt processing.

9. An electric vacuum cleaner, comprising:

a brushless motor;

an air blower rotatably driven by the brushless motor;

an inverter circuit which drives the brushless motor;

rotation position detecting means which detects a predetermined rotational position interval of a rotor of the brushless motor;

a microprocessor;

interrupt processing means which allows the microprocessor to execute a process for detecting the predetermined rotational position interval of a rotor of the brushless motor by use of the rotation position detecting means according to interrupt processing;

PWM control means which allows the microprocessor to execute a process for outputting a PWM signal through the use of a detected signal of the predetermined rotational position interval with respect to the amount of each current supplied from the inverter circuit to the brushless motor to thereby cause the microprocessor to execute PWM control; and inrush current limiting means which allows the microprocessor to execute a process for enlarging the pulse width of the PWM signal during the interrupt processing upon the startup of the brushless motor and for progressively enlarging the pulse width of the PWM signal according to the repetition of the interrupt processing;

wherein the inrush current limiting means allows the microprocessor to execute a process for monotonously decreasing a value of a current control signal for determining the pulse width of the PWM signal by comparison with a predetermined repetitive waveform during the interrupt processing to thereby monotonously change the pulse width.

10. The electric vacuum cleaner according to claim 9, wherein the inrush current limiting means allows the microprocessor to execute a process for stopping the rotation of the brushless motor when a current flowing through each of windings of the brushless motor exceeds an overcurrent detected value preset to a value larger than an inrush current at the startup of the brushless motor.

11. The electric vacuum cleaner according to claim 9, wherein the interrupt processing means detects and triggers the edge of a signal detected by the rotation position detecting means to thereby allow the microprocessor to execute the interrupt processing.

12. The electric vacuum cleaner according to claim 11, wherein the interrupt processing means allows the microprocessor to execute a process for switching the same terminals between the function of inputting the signal detected by the rotation position detecting means to the microprocessor and the function of generating the interrupt processing.

* * * * *